US012226800B2

(12) United States Patent
Jones

(10) Patent No.: US 12,226,800 B2
(45) **Date of Patent: *Feb. 18, 2025**

(54) ACOUSTIC TRANSDUCER

(71) Applicant: Thales Australia Limited, Sydney Olympic Park (AU)

(72) Inventor: David Ronald Jones, Cherrybrook (AU)

(73) Assignee: Thales Australia Limited, Sydney Olympic Park (AU)

(*) Notice: Subject to any disclaimer, the term of this patent is extended or adjusted under 35 U.S.C. 154(b) by 0 days.

This patent is subject to a terminal disclaimer.

(21) Appl. No.: 18/324,873

(22) Filed: May 26, 2023

(65) Prior Publication Data

US 2023/0294132 A1 Sep. 21, 2023

Related U.S. Application Data

(63) Continuation of application No. 16/346,150, filed as application No. PCT/AU2017/050970 on Sep. 7, 2017, now Pat. No. 11,697,134.

(30) Foreign Application Priority Data

Oct. 31, 2016 (AU) ................................ 2016904446

(51) Int. Cl.

*H04R 1/28* (2006.01)
*B06B 1/06* (2006.01)
(Continued)

(52) U.S. Cl.

CPC .......... *B06B 1/0603* (2013.01); *G10K 11/006* (2013.01); *H04R 1/2834* (2013.01);
(Continued)

(58) Field of Classification Search

CPC . B06B 1/0603; B06B 2201/74; H04R 1/2834; H04R 1/403; H04R 1/44; H04R 17/00; H04R 31/003; G10K 11/006
(Continued)

(56) References Cited

U.S. PATENT DOCUMENTS 4,051,455 A 9/1977 Fowler
5,016,228 A 5/1991 Arnold et al.
(Continued)

FOREIGN PATENT DOCUMENTS

EP 2735380 A1 5/2014
JP 2008060777 A 3/2008
(Continued)

OTHER PUBLICATIONS

International Search Report for Application No. PCT/AU2017/050970 dated Nov. 14, 2017 (3 pages).
(Continued)

*Primary Examiner* — Norman Yu
(74) *Attorney, Agent, or Firm* — Michael Best & Friedrich LLP

(57) ABSTRACT

An acoustic transducer (30), comprising: a support structure (36); an active assembly comprising a base plate (32) supported by the support structure (36) and a piezoelectric body (34) supported by the base plate (32); and a passive vibrator (38) supported by the support structure (36) and coupled via the support structure (36) to the active assembly (32, 34) so that vibration of the active assembly (32, 34) drives the passive vibrator (38). The active assembly (32, 34) and the passive vibrator (38) have the same resonant frequency.

14 Claims, 3 Drawing Sheets

(51) Int. Cl.

| | |
|---|---|
| ***G10K 11/00*** | (2006.01) |
| ***H04R 1/40*** | (2006.01) |
| ***H04R 1/44*** | (2006.01) |
| ***H04R 17/00*** | (2006.01) |
| ***H04R 31/00*** | (2006.01) |

(52) U.S. Cl.
CPC ............... *H04R 1/403* (2013.01); *H04R 1/44* (2013.01); *H04R 17/00* (2013.01); *H04R 31/003* (2013.01); *B06B 2201/74* (2013.01)

(58) Field of Classification Search
USPC ........ 381/190, 191, 173, 114; 310/324, 330, 310/334, 322
See application file for complete search history.

(56) References Cited

U.S. PATENT DOCUMENTS

| | | | | |
|---|---|---|---|---|
| 7,555,133 | B2 | 6/2009 | Hama | |
| 8,139,443 | B2 | 3/2012 | Armstrong | |
| 2001/0035700 | A1 | 11/2001 | Percin et al. | |
| 2004/0037441 | A1* | 2/2004 | Konishi | H04R 1/2842 381/423 |
| 2004/0100163 | A1 | 5/2004 | Baumgartner et al. | |
| 2004/0218779 | A1 | 11/2004 | Fukuyama et al. | |
| 2008/0056515 | A1 | 3/2008 | Hama | |
| 2008/0218031 | A1 | 9/2008 | Kuroda et al. | |
| 2011/0026367 | A1 | 2/2011 | Noelle | |
| 2013/0028458 | A1* | 1/2013 | Suzuki | H04R 1/2834 381/338 |
| 2014/0270193 | A1 | 9/2014 | Jones | |
| 2015/0181342 | A1 | 6/2015 | Li | |
| 2016/0303360 | A1 | 10/2016 | Mulvihill et al. | |

FOREIGN PATENT DOCUMENTS

| | | | |
|---|---|---|---|
| WO | 03009635 | A2 | 1/2003 |
| WO | 2015171224 | | 11/2015 |
| WO | 2016054447 | | 4/2016 |
| WO | 2016115363 | | 7/2016 |

OTHER PUBLICATIONS

United Arab Emirates Patent Office Action for Related Application No. P6000632/2019 dated Mar. 17, 2023 (10 pages).
European Patent Office Action for Related Application No. 17866280.5 dated Mar. 11, 2022 (7 pages).
Translation of Japanese Patent Office Action for Application No. 2019-544939 dated Aug. 31, 2021 (3 pages).
Intellectual Property Office India Examination Report for Application No. 201917018334 dated Jun. 27, 2021 (6 pages including English translation).
Chilean Patent Office Search Report for Application No. 201901173 dated Aug. 11, 2020 (4 pages including statement of relevance).
European Patent Office Extended Search Report for Application No. 17866280.5 dated Jun. 2, 2020 (8 pages).

* cited by examiner

ACOUSTIC TRANSDUCER

RELATED APPLICATION

This application is a continuation of U.S. patent application Ser. No. 16/346,150 filed 30 Apr. 2019, which is a 371 national phase of International patent application no. PCT/AU2017/050970 filed 7 Sep. 2017, which is based on and claims the benefit of the filing and priority dates of Australian patent application no. 2016904446 filed 31 Oct. 2016, the content of which as filed is incorporated herein by reference in its entirety.

FIELD OF THE INVENTION

The present invention is generally related to an acoustic transducer, of particular but by no means exclusive application as an underwater acoustic transducer.

BACKGROUND TO THE INVENTION

Acoustic or sonar transducers are employed to conduct, for example, marine geophysical surveys; they may be used as acoustic signal transmitters in sonobuoys, as transmitters for communications buoys, or in towed arrays as active sources.

One type of such a transducer is referred to as a piezoelectric bender, because it employs piezoelectric elements, typically of a ceramic material, to generate vibration. In transducers of this kind, the piezoelectric ceramic is generally the most costly component, and may amount to about 80% of the parts cost; it also usually contributes significantly to the transducer's mass. Ideally it is therefore desirable to use the smallest possible quantity of ceramic in a design, though the volume of ceramic required to provide enough power handling capability imposes a lower limit to any such paring or trimming of the ceramic components.

FIGS. 1A and 1B show schematically the configuration of such a known acoustic transducer, in the form of a piezoelectric bender 10. FIG. 1A is a top view (with encapsulating waterproof overmoulding omitted for clarity), while FIG. 1B is a cross sectional view through the centre of bender 10. These figures, it should be noted, are not to scale. Bender 10 comprises two identical circular base plates 12, 14. Each base plate 12, 14 has attached thereto a respective ceramic piezoelectric body 16, 18, thereby forming a pair of active assemblies, each comprising a base plate and a piezoelectric body. Bender 10 also includes an annular support structure 20 to which base plates 12, 14 are attached, which flexes as base plates 12, 14 are driven to vibrate about their respective equilibrium positions. (Support structure 20 would not normally be visible in the view of FIG. 1A, but its inner periphery is shown in dashed line to aid understanding.) In this example these components are circular, but in other examples they may be elliptical or rectangular. All of these components are encapsulated in a waterproof overmoulding 22.

Base plates 12, 14 and support structure 20 define an internal cavity 24, which may be filled with air, some other gas, a liquid, or a liquid with compliant components. The piezoelectric body 16, 18 are driven electrically so that the active assemblies vibrate in phase and resonate at the same frequency.

U.S. Pat. No. 8,139,443 discloses an underwater sound projector system that includes an array of acoustic transducers of this general type.

SUMMARY OF THE INVENTION

In a first broad aspect, the invention provides an acoustic transducer, comprising:

- a support structure;
- an active assembly comprising a base plate supported by the support structure and a piezoelectric body supported by (and typically bonded to) the base plate; and
- a passive vibrator supported by the support structure and coupled via the support structure to the active assembly so that vibration of the active assembly drives the passive vibrator;
- wherein the active assembly and the passive vibrator have the same resonant frequency.

The passive vibrator may be described as acting like a diaphragm. When the piezoelectric body is appropriately electrically driven, the active assembly and the passive vibrator radiate into the surrounding medium substantially equally.

In one embodiment, the piezoelectric body is a piezoelectric ceramic body. In another embodiment, the piezoelectric body is a single crystal body.

The base plate may be metallic. The passive vibrator may be metallic.

While the base plate and the passive vibrator may be of different (e.g. metallic) composition, in an embodiment, the base plate and the passive vibrator are of the same metallic composition, the passive vibrator differing in thickness from the base plate such that the active assembly and the passive vibrator have a common resonant frequency.

In an embodiment, the passive vibrator comprises a plate.

In one embodiment, the transducer is circular (that is, as seen in the view of, for example, FIG. 1A). In other embodiments, the transducer is elliptical or rectangular, and still other shapes are contemplated.

A cavity defined by the active assembly, the vibrator and the support structure may be filled with a fluid, whether liquid or gas.

The support structure may be integral with the base plate and/or the passive vibrator.

In a second broad aspect, the invention provides a transducer array, comprising:

- a plurality of acoustic transducers as claimed in any one of the preceding claims;
- wherein the plurality of acoustic transducers are spaced apart to utilise mutual interaction and thereby increase performance.

In a third broad aspect, the invention provides a method of manufacturing an acoustic transducer, the method comprising:

- coupling an active assembly comprising a base plate and a piezoelectric body supported by the base plate to a passive vibrator by a support structure, such that vibration of the active assembly drives the passive vibrator at a common resonant frequency.

In an embodiment, the piezoelectric body is a piezoelectric ceramic body.

In another embodiment, the base plate and the passive vibrator are of the same metallic composition, the passive vibrator differing in thickness from the base plate such that the active assembly and the passive vibrator have a common resonant frequency.

In one embodiment, the passive vibrator comprises a plate.

In certain embodiments, the transducer is circular, elliptical or rectangular.

In further embodiments, a cavity defined by the active assembly, the vibrator and the support structure is filled with a fluid.

In an embodiment, the support structure is integral with the base plate and/or the passive vibrator.

It should be noted that any of the various individual features of each of the above aspects of the invention, and any of the various individual features of the embodiments described herein including in the claims, can be combined as suitable and desired.

BRIEF DESCRIPTION OF THE DRAWINGS

In order that the invention may be more clearly ascertained, embodiments will now be described, by way of example, with reference to the accompanying drawing, in which.

DETAILED DESCRIPTION OF EMBODIMENTS OF THE INVENTION

Figure 1B:
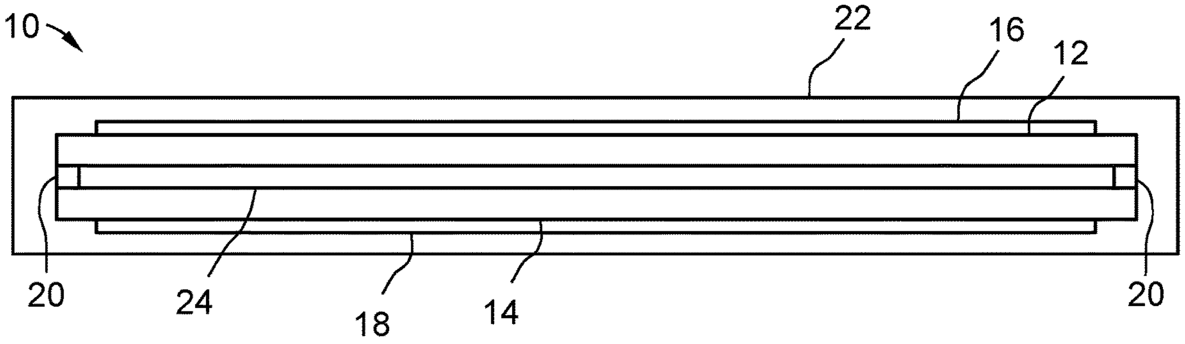
Figure 1B ( background art )
Figure 2:
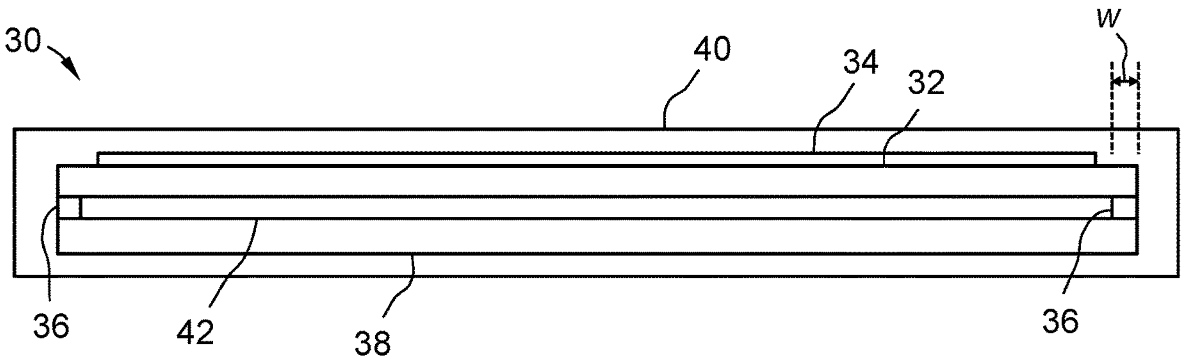
FIG. 2 is a schematic cross-sectional view of a piezoelectric bender according to an embodiment of the present invention.

FIG. 2 is a schematic cross sectional view (comparable to that of FIG. 1B) of an acoustic transducer in the form of a piezoelectric bender 30. Bender 30 comprises an active assembly comprising a circular base plate 32 and a piezoelectric body 34 bonded to the base plate 32. In this embodiment, base plate 32 is metallic (e.g. of steel) or make of a ceramic (e.g. alumina).

Bender 30 includes an annular support structure 36 or 'hinge' to which base plate 32 is attached, and a passive vibrator 38 in the form of a plate, also supported by the base plate 32 but on the opposite side of the base plate 32 relative to the active assembly. These components are encapsulated in a waterproof overmoulding 40. In this embodiment the encapsulant is a polyurethane, but in other embodiment, the encapsulant is made of rubber or another low modulus material.

Bender 30 is, in use, activated by a power supply (not shown) that is coupled to the piezoelectric body 34. Such a power supply is typically a high voltage power supply that includes an amplifier having voltage, current or output power feedback to control its output.

The active assembly 32, 34 and the passive vibrator 38 are constructed to have the same resonant frequency, and are mechanically coupled via the support structure 36. Hence, when the piezoelectric body 34 and active assembly 32, 34 is driven, the passive vibrator 38—owing to its being coupled to active assembly 32, 34—is actuated by the moment induced in the support structure 36 and vibrates at the same resonant frequency.

The base plate 32, support structure 36 and passive vibrator 38 define an internal cavity 42, which may be filled with air, some other gas, a liquid, or a liquid with compliant components.

The physical characteristics of the passive vibrator 38 (such as its density, thickness and modulus) are selected so that it has the same resonant frequency as the active assembly 32, 34. It may be desirable, in order to match the respective resonant frequencies, to model bender 30 (with, for example, FEA) to account for the complex boundary conditions. In this embodiment, passive vibrator 38 is made from metals such as steel or aluminium, or from a ceramic such as alumina. Other materials may alternatively be used, subject to being able to withstand the static pressure due to the depth of likely deployment.

The support structure 36 is shown in FIG. 2 as a separate component, but may be formed integrally with base plate 32 or passive vibrator 38. The support structure 36 has a width w that is minimised in order to reduce the rotational constraint that it imposes on base plate 32 or passive vibrator 38. The elastic limits of the material of the support structure 36 determines how thin the hinge can be made, again subject to expected static and dynamic loads. In this embodiment, support structure 36 is made of high tensile metals such as steel, or from a ceramic such as alumina. Other materials may alternatively be used, subject to being able sufficiently to withstand dynamic fatigue and static pressure due to the depth of likely deployment.

Figure 3:
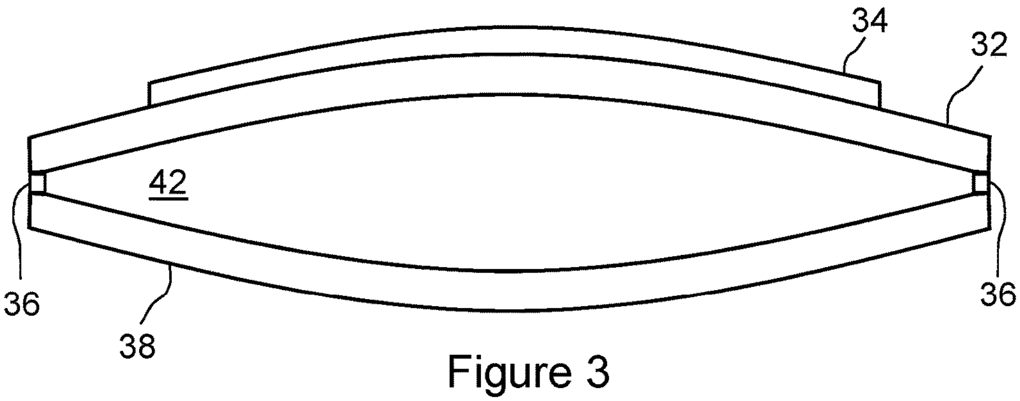
FIG. 3 is a schematic cross-sectional view of the piezoelectric bender of FIG. 3 in use.

FIG. 3 is a schematic view of bender 30 in use (with waterproof overmoulding 40 omitted for clarity), with the active assembly 32, 34 and the passive vibrator 38 at maximum displacement from their equilibrium or undriven positions. Both are radiating into the surrounding medium.

Figure 4:
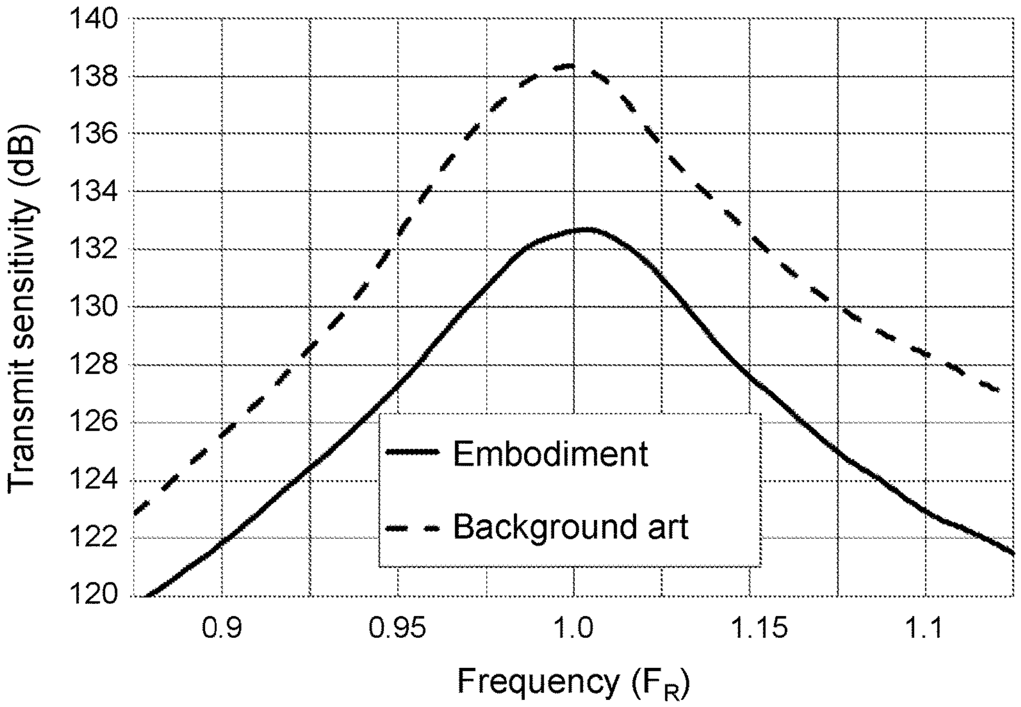
FIG. 4 is a plot of transmit sensitivity (dB) versus frequency, for both a background art bender and a bender according to the embodiment of FIG. 2.
Figure 5:
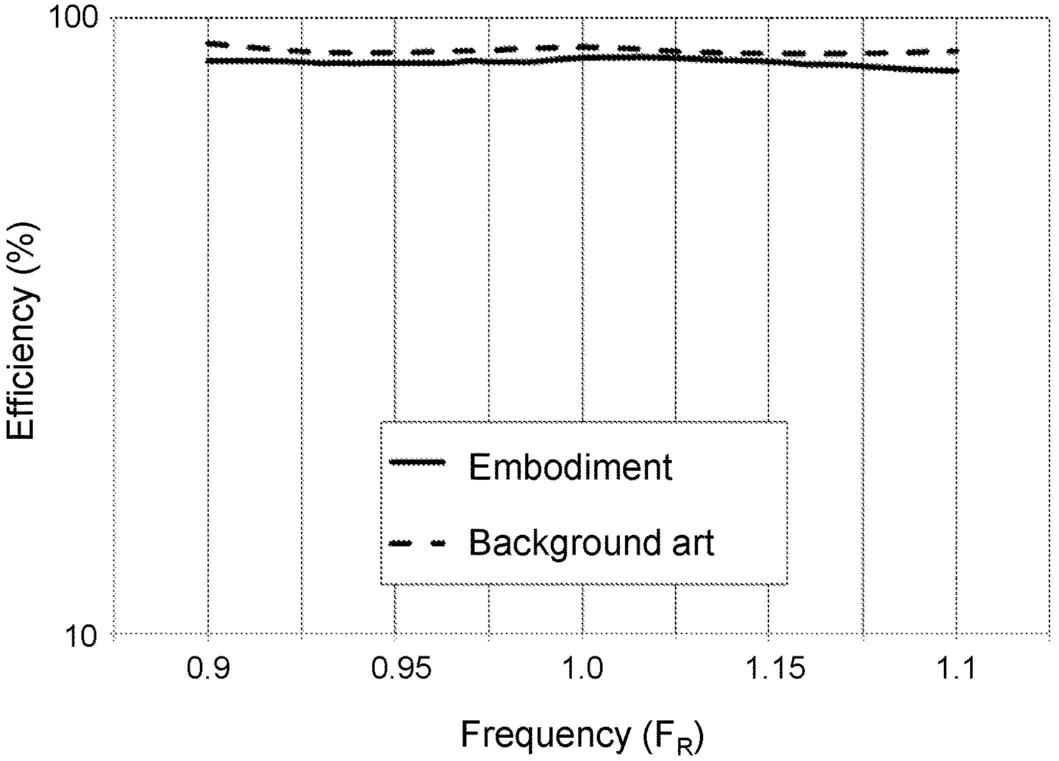
FIG. 5 is a plot of efficiency (%) versus frequency (kHz), for both a background art bender and a bender according to the embodiment of FIG. 2.

FIG. 4 is a plot of experimental results of measurements of transmit sensitivity (dB) versus frequency (relative to resonant frequency, $F_R$), for both a background art bender (of the type shown in FIGS. 1A and 1B), shown with a dashed curve, and a bender according to this embodiment, shown with a solid curve. The plot shows, in effect, the output power as a function of frequency, for a fixed driving voltage. FIG. 5 is a plot of experimental results of measurements of efficiency (%) versus frequency (relative to resonant frequency, $F_R$, 3 kHz in this example), also for both a background art bender (of the type shown in FIGS. 1A and 1B), shown with a dashed curve, and a bender according to this embodiment, shown with a solid curve.

It will be observed that the response of the bender according to this embodiment—measured as intensity—is approximately halved (that is, is 6 dB lower) compared with the background art bender, but that the efficiency of the bender according to this embodiment remains usefully high—and indeed is little diminished compared with the background art bender. It is also envisaged that refinement of the material of the passive vibrator 38, including by the use of low damping materials, should improve the efficiency of the bender according to this embodiment further. The transmit voltage response is reduced (compared with the background art bender) but, to provide equivalent performance, this drop can be compensated for by increasing the driving voltage by the same factor.

Figure 6:
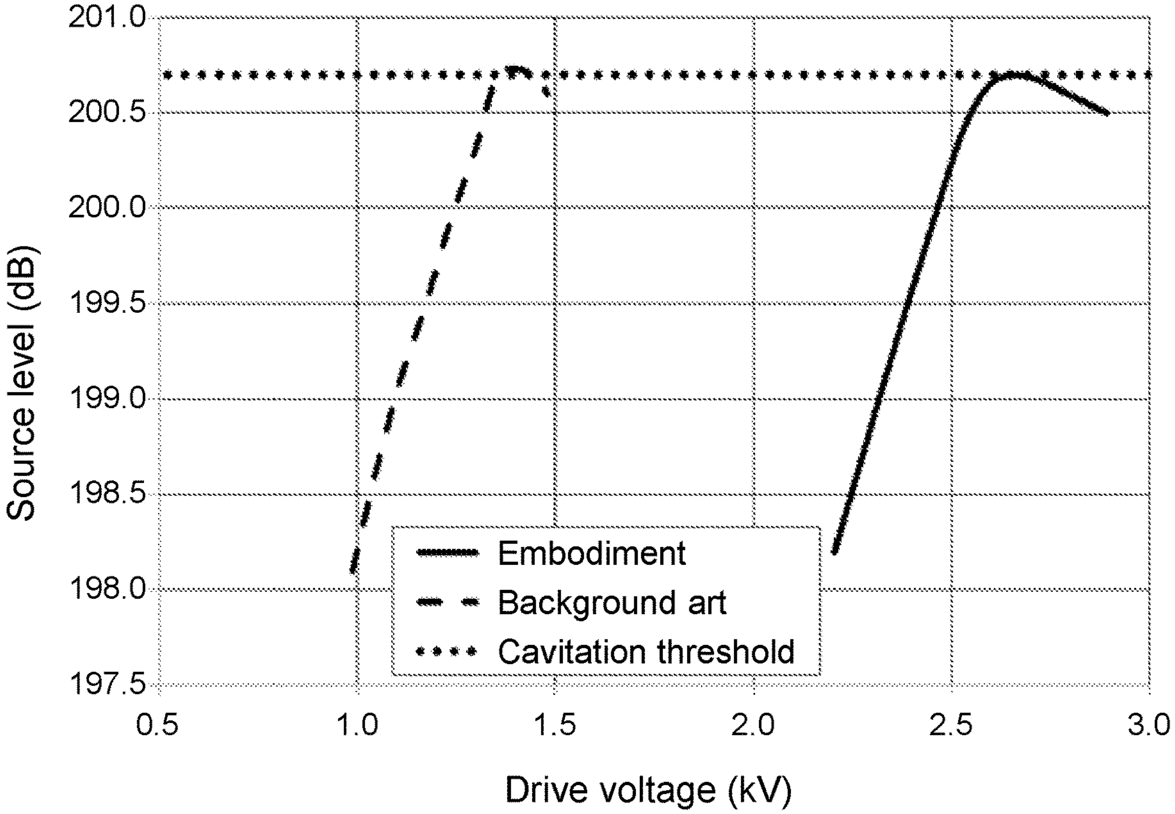
FIG. 6 is a plot of source level versus drive voltage, for both a background art bender and a bender according to the embodiment of FIG. 2.

Careful design of bender 30 (and in particular of the passive vibrator 38) should allow the amplitude of the displacement of the passive vibrator 38 to be matched to that of the active assembly 32, 34. Radiation area is then maintained giving the same cavitation threshold as the equivalent background art bender. This is demonstrated by FIG. 6, which is a plot of experimental results of measurements of source level (dB) versus drive voltage (kV), for both a background art bender (of the type shown in FIGS. 1A and 1B), shown with a dashed curve, and a bender according to this embodiment, shown with a solid curve. The cavitation threshold is also plotted, shown with a dotted line, demonstrating that it closely matches that of the bender of the background art.

Figure 1A:
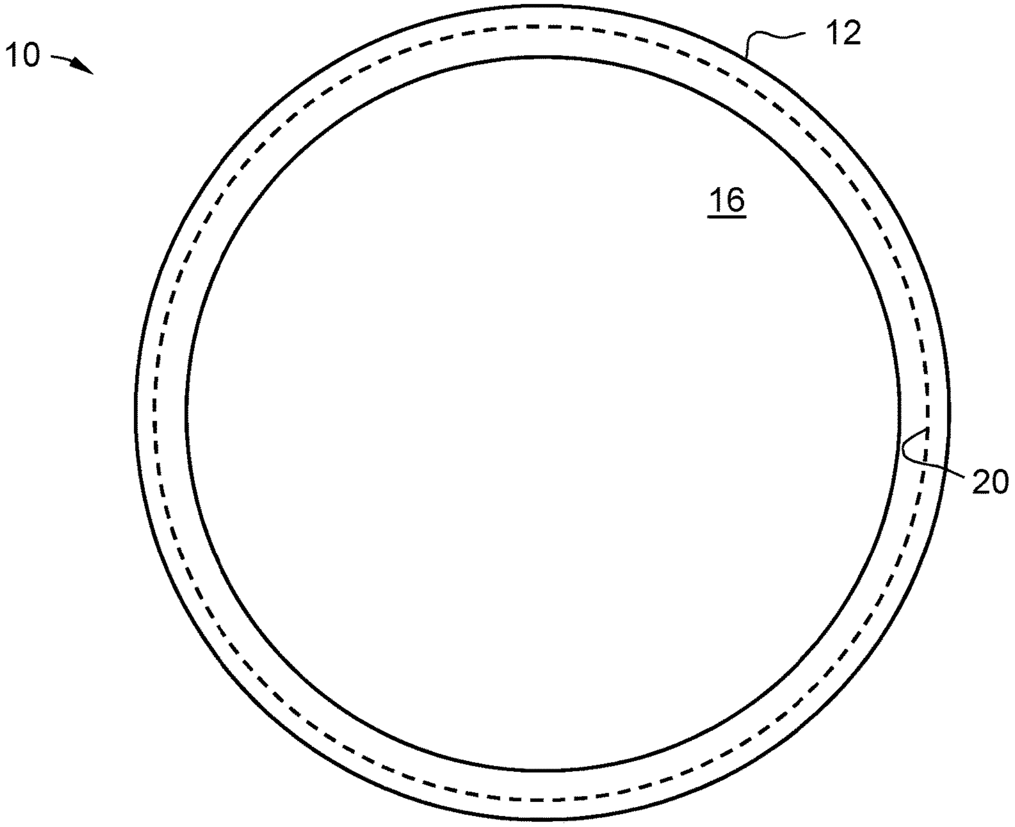
Figure 1A ( background art )
FIGS. 1A and 1B are schematic views of a piezoelectric bender according to the background art.

When compared with background art bender 10 of FIGS. 1A and 1B, passive vibrator 38 of bender 30 is thicker than base plate 14 thereby compensating for the stiffness otherwise contributed by omitted ceramic piezoelectric body 18. However, passive vibrator 38 is thinner than the total thickness of the active assembly (comprising base plate 14 and ceramic body 18), as the passive vibrator is generally much stiffer than the piezoceramic of ceramic piezoelectric body 18, allowing tighter packing and closer spacing of benders according to the present invention in a transducer array. It is envisaged that such a transducer array can exploit the phenomenon of the mutual coupling of the benders.

In addition, the overall mass of bender 30 may be reduced compared with the background art bender 10.

It will be understood to persons skilled in the art of the invention that many modifications may be made without departing from the spirit and scope of the invention.

In the claims that follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art is referred to herein, such reference does not constitute an admission that such prior art forms a part of the common general knowledge in the art, in any country.

What is claimed is:

1. An acoustic transducer array, comprising:
- a plurality of acoustic transducers connected in an array configuration,
  - the plurality of acoustic transducers including at least one first bender type acoustic transducer comprising:
    - an active assembly comprising a base plate and a piezoelectric body supported by the base plate;
    - a passive vibrator comprising a plate; and
    - a support structure arranged between the active assembly and passive vibrator, to mechanically couple the active assembly to the passive vibrator on opposite sides of the support structure,
- the support structure acting as a hinge so that bending vibration of the active assembly drives bending vibration of the passive vibrator at the same frequency as that of the active assembly so that both the active assembly and passive vibrator bend to radiate acoustic vibrations of the same frequency into the surrounding medium in opposing directions.

2. An acoustic transducer array as claimed in claim 1, wherein the piezoelectric body for the first bender type acoustic transducer is a piezoelectric ceramic body.

3. An acoustic transducer array as claimed in claim 2, wherein the passive vibrator of the first bender type acoustic transducer has a planar shape and planar dimensions that are the same as the base plate.

4. An acoustic transducer array as claimed in claim 3, wherein for the first bender type acoustic transducer, the base plate and the passive vibrator are of the same metallic composition, the passive vibrator differing in thickness from the base plate such that the active assembly and the passive vibrator have a common resonant frequency.

5. An acoustic transducer array as claimed in claim 3, wherein for the first bender type acoustic transducer, the passive vibrator is of a different material composition from the base plate and having a stiffness matched to that of the active assembly.

6. An acoustic transducer array as claimed in claim 3, wherein for the first bender type acoustic transducer, a cavity defined by the active assembly, the vibrator and the support structure is filled with a fluid.

7. An acoustic transducer array as claimed in claim 3, wherein for the first bender type acoustic transducer, the support structure is integral with the base plate and/or the passive vibrator.

8. An acoustic transducer array as claimed in claim 1, wherein each one of the plurality of acoustic transducers has the same external planar shape and planar dimensions.

9. An acoustic transducer as claimed in claim 8, wherein the planar shape of the plurality of acoustic transducers is circular.

10. An acoustic transducer as claimed in claim 8, wherein the planar shape of the plurality of acoustic transducers is elliptical or rectangular.

11. An acoustic transducer array as claimed in claim 3 wherein each one of the plurality of acoustic transducers has the same external planar shape and planar dimensions.

12. A transducer array as claimed in claim 11, wherein the plurality of acoustic transducers are arranged to, in operation, be spaced apart to utilise mutual interaction and thereby increase performance.

13. A transducer array as claimed in claim 8 wherein the plurality of acoustic transducers are arranged to, in operation, be spaced apart to utilise mutual interaction and thereby increase performance.

14. A transducer array as claimed in claim 1, wherein the plurality of acoustic transducers includes one or more first bender type acoustic transducers and one or more second bender type acoustic transducers, each of the second bender type transducers comprising two identical circular base plates having attached thereto a respective ceramic piezoelectric body and an annular support structure to which the base plates are attached, and the base plates are caused to vibrate about their respective equilibrium positions by driving the respective attached piezoelectric body.

* * * * *